United States Patent Office 2,916,439
Patented Dec. 8, 1959

2,916,439

HYDROFORMING PROCESS WITH MOLYBDENA ON ALUMINA-SILICA CATALYST

Otto Schricker, Jr., Nixon, N.J., assignor to Esso Research and Engineering Company, a corporation of Delaware No Drawing. Application November 10, 1953
Serial No. 391,385

6 Claims. (Cl. 208—136)

This invention relates to improvements in the hydroforming of hydrocarbons. More particularly it relates to improvements in hydroforming wherein a molybdena catalyst on a carrier containing a major proportion of aluminum and a minor proportion of silica is activated at elevated temperatures and utilized while still hot in the hydroforming reaction.

Hydroforming is defined as an operation in which a petroleum naphtha is contacted at elevated temperatures and pressures and in the presence of a recycled hydrogen-containing gas with a solid catalytic material under conditions such that there is no net consumption of hydrogen.

Usually the feed stock boils substantially within the range of from about 150°–430° F. and more particularly 200°–350° F. The light ends, i.e., the material boiling from about 0°–200° F., are not usually subjected to this reaction, for the reason that the virgin naphtha light ends have a fairly good octane rating. The feed or charging stock to the hydroforming reactior can be a virgin naphtha, a cracked naphtha, a Fischer-Tropsch naphtha, a mixture of these, or the like.

Hydroforming operations are ordinarily carried out in the presence of hydrogen or hydrogen-rich recycle gas at temperatures of 750°–1150° F., in a pressure range of about 50 to 1000 pounds per square inch, and in contact with such molybdena type catalysts as molybdenum oxide, chromium oxide, or, in general, oxides or sulfides of metals of groups IV, V, VI, VII, and VIII of the periodic system of elements alone, or generally supported on a base or spacing agent such as alumina gel, precipitated alumina, or zinc aluminate spinel. A good hydroforming catalyst is one containing about 10 weight percent molybdenum oxide upon an aluminum oxide base prepared by heat treating a hydrated aluminum oxide or upon a zinc aluminate spinel.

The chemical reactions involved in the hydroforming process include dehydrogenation of naphthenes to the corresponding aromatics, isomerization of straight chain paraffins to form branched chain paraffins, isomerization of cyclic compounds such as ethylcyclopentane to form methylcyclohexane, and some aromatization, dealkylation and hydrocracking of paraffins. In a hydroforming operation which is conducted efficiently it is possible with the use of a proper catalyst and proper conditions of operation to hydroform a virgin naphtha having an octane number of about 50 to a hydroformate having an octane number of from 95 to 98 and obtain yields of $C_{5+}$ hydrocarbons as high as 85%.

It has been proposed in application Serial No. 188,236, filed October 3, 1950, now U. S. Patent No. 2,689,823, to effect the hydroforming of naphtha fractions in the presence of a dense fluidized catalyst mass in a fluidized solids reactor system in which naphtha vapors are passed continuously through the dense, fluidized bed of hydroforming catalyst particles in a reaction zone, spent catalyst particles being withdrawn from the dense bed in the reaction zone and passed to a separate regeneration zone where fouling, deactivating carbonaceous deposits are removed by combustion, whereupon the regenerated catalyst particles are returned to the main reactor vessel. Fluid hydroforming, as thus conducted, has several fundamental advantages over fixed bed hydroforming such as (1) the operations are continuous, (2) the vessels and equipment can be designed for single rather than dual functions, (3) the reactor temperature is substantially constant throughout the bed, and (4) the regeneration or reconditioning of the catalyst may be readily controlled.

A particularly useful catalyst for these operations has been found to be molybdic oxide supported on an active alumina-containing base. The molybdic oxide utilized in the catalyst based on the base is in the range of 5 to 15 weight percent, usually about 10 weight percent. This catalyst has also been found useful in a variety of other hydrocarbon conversion reactions such as hydrogen transfer.

In a prior application filed in the name of Charles E. Hemminger on October 31, 1952, Serial No. 318,000, now abandoned, for "Improvements in Hydroforming," there is described and claimed a method of preparing an improved attrition resistant catalyst base containing a major proportion af aluminum and a minor proportion of silica prepared by mixing together aluminum sulfate, sodium aluminate and a relatively small amount of sodium silicate in an aqueous medium maintained at a final pH of between 9 and 10. The slurry resulting from this mixture is filtered and washed several times and finally spray-dried. This base contains from 1 to 5 weight percent, and preferably about 2 weight percent, silica.

In preparing the hydroforming catalyst itself by the preferred impregnation method, the base or carrier is impregnated with a water-soluble molybdenum salt which is, at the same time, heat decomposable, e.g., ammonium molybdate. The impregnated base is dried, heated and calcined. The amount of molybdenum salt impregnated into the base is such as to give a molybdenum oxide ($MoO_3$) content of about 10% based on the total weight of the catalyst.

The catalyst can also be prepared by the so-called "dry mix" method. In that process the base is simply mixed with molybdic oxide. The catalyst thus can be prepared by a simple mixing of the dry powders and pelleting. The catalyst is then activated by heating in air or nitrogen at a temperature of about 1200° F. some time prior to use.

Because of the large quantities of feed stocks that are processed in reactions such as hydroforming, a good deal of research has been expended in improving the selectivity and activity of the conversion in the use of the molybdic oxide-alumina silica catalysts. The selectivity is defined as the gasoline yield for a given octane number product.

It has now been found that the activity of these particular molybdena catalysts, i.e., with carriers containing a major proportion of alumina and a minor proportion of silica, is appreciably improved by heating them to a temperature of 1400°–1500° F. for from one to six hours in a flowing stream of inert gas and charging the catalyst to the hydroforming process while the catalyst is still hot, i.e., so that it has not cooled down below a minimum temperature of 750° F. immediately prior to its use in the process.

The process of this invention is thus applicable to a fixed bed or fluidized process, although the latter is preferred and is particularly suited for fresh makeup catalyst. The catalyst is calcined, preferably in a fluid bed itself, in a calciner utilizing an inert gas. In fixed bed hydroformers a direct fired rotary kiln could be used to calcine catalyst while a reactor was being charged. The heat treatment of this invention is utilized even though the catalyst system has originally been calcined during the course of its preparation.

The temperature utilized is important. Temperatures below 1400° F. give inferior results, whereas high temperatures give excessive loss of molybdena. The deleterious effects of higher temperatures can be avoided somewhat by feeding in vaporized molybdena with the fluidizing gas in a fluidized heat treatment. The heating of the fluidized gas itself can be accomplished by bringing the gas to the desired temperature by conventional means in a direct fired furnace. It can also be heat exchanged with the reactor effluent and then with regenerator flue gas. The remaining heat to raise the temperature would then be supplied by a furnace.

The inert gases that can be utilized in the heat treatment include air, nitrogen, and recycle gas containing water up to about 5 mole percent, scrubbed to remove all carbon and sulfur compounds, and regenerator flue gas, with all carbon and sulfur compounds removed, giving a gas high in $N_2$ and already at an elevated temperature. It is important that the gas be flowing rather than stagnant, as data show that stagnant gases give far inferior results. Flow rates as low as 10 v./hr./v. can be used, but it is preferable to employ 1000–4000 v. of gas/hr./v. catalyst.

It is also important that the catalyst be utilized immediately after being subjected to the heat treatment or as close thereto as possible. The minimum temperature to which it can be cooled controls this feature.

This invention will be better understood by reference to the following examples showing the effect on the activity of a catalyst processed as taught in this invention and the conditions of operation of various components utilized in a fluidized process.

EXAMPLE I

Catalysts containing 10% molybdena on Nalco HF–85 alumina (one containing 2.1 weight percent silica on the base) were utilized in a hydroforming process. The molybdena had been put on the carrier by impregnation, the preferred method. The catalysts, except the control, were all heated to 1400° F. under varying conditions as set forth in the table below. They were then utilized in controlled hydroforming operations at 900° F., 200 p.s.i.g., 5000 s.c.f./b. of once-through hydrogen, and 0.7 mole percent $H_2O$, utilizing a virgin naphtha boiling in the range of 200°–330° F.

Conditions in reactor

|  | Preferred | Range |
|---|---|---|
| Catalyst Composition | 10% $MoO_3$ | 5–15% $MoO_3$ |
| Temperature, °F | 900–950 | 750–1,150 |
| Pressure, p.s.i.g | 150–250 | 50–1,000 |
| Catalyst to oil ratio | 0.5–3.0 | 0.1 to 7 |
| Cu. ft. of recycled gas fed/bbl. of oil | 2,500–7,000 | 2,000–10,000 |
| Concentration of $H_2$ in recycle gas | 60–90 | 50–95 |

Conditions in regenerator

|  | Preferred | Range |
|---|---|---|
| Temperature, °F | 1,100–1,200 | 900–1,250 |
| Pressure, p.s.i.g | 150–250 | 50–500 |
| Residence time, minutes | 6–30 | 6–180 |
| Fluidizing gas velocity | 0.4 to 1.0 | 0.3 to 2.0 |

In the fluid hydroforming process itself the feed stock is preheated alone or in admixture with recycle gas to reaction temperature or to the maximum temperature possible while avoiding thermal degradation of the feed stock. Ordinarily preheating of the feed stock is carried out to temperatures of about 800°–1000° F., preferably about 950° F. The naphtha preheat should be as high as possible while avoiding thermal degradation thereof as by limiting the time of residence in the transfer or feed inlet lines. The preheated feed stock may be supplied to the reaction vessel in admixture with hydrogen-rich recycle gas or it may be introduced separately. The recycle gas, which contains from about 50 to 85 volume percent hydrogen, is preheated to temperatures of about 1150°–1200° F., preferably about 1185° F., prior to the introduction thereof into the inlet line. The recycle gas should be circulated through the reactor at a rate of from about 1000 to 8000 cubic feet per barrel of naphtha feed. The amount of recycle gas added is preferably the minimum amount that will suffice to carry the necessary heat of reaction into the reaction zone and keep the carbon formation at a satisfactory low level The reactor system is charged with a mass of finely divided hydroforming catalyst particles. The catalyst particles are, for the most part between 200 and 400 mesh in size, or about 0–200 microns in diameter, with a major proportion between 20 and 80 microns.

Space velocity or the weight in pounds of feed charged per hour per pound of catalyst in the reactor depends upon the age or activity level of the catalyst, the character of the feed stock, and the desired octane number of the product. Space velocity may vary, for example, from about 1.5 wt./hr./wt. to about 0.15 wt./hr./wt.

It is to be understood that this invention is not limited to the specific examples, which have been offered merely

|  | Control | 1 | 2 | 3 | 4 |
|---|---|---|---|---|---|
| Calcination Temp., °F | 1,200 | 1,400 | 1,400 | 1,400 | 1,400. |
| Calcination Time, Hours | 6 | 6 | 6 | 6 | 6. |
| Calcined in Presence of | Stagnant Air. | Flowing $N_2$. | Flowing $N_2$. | Flowing $N_2$. | Stagnant Air. |
| Time of Storage Prior to Use—Days | 270 | 0 | 3 | 30 | 0. |
| Activity—W./Hr./W. for 95 O.N | 0.35 | 0.80 | 0.53 | 0.33 | 0.2. |

These figures demonstrate how the maximum activity was obtained with a catalyst used immediately after being heated and that the activity declined sharply with the storage time of the catalyst. The flowing gas was also shown to be important. The improvement over the control is apparent. Other data show that the activity obtained by heating to 1400°–1500° F. is superior to that gotten from heating at lower temperature. There is no difference on the utilization of different inert gases as long as the desired flowing features prevail.

The following conditions are those utilized in a typical fluidized process.

as illustrations, and that modifications may be made without departing from the spirit of the invention.

What is claimed is:

1. In a process for hydroforming petroleum naphthas in contact with finely divided molybdena catalyst particles at 750 to 1150° F., said molybdena being on a carrier containing a major proportion of alumina and a minor proportion of silica, and in accordance with the fluidized solids technique, the improvement which comprises heating the catalyst to a temperature of 1400°–1500° F. for from one to six hours in a flowing stream of inert gas cooling the heated catalyst to a temperature of above 150° F., and charging said hot catalyst to the hydroforming process immediately so that it does not cool down below a minimum temperature of 750° F.

2. The process of claim 1 in which the molybdena catalyst is prepared by impregnation on the carrier.

3. The process of claim 1 in which the catalyst contains from about 5 to 15 weight percent molybdena and th carrier contains from about 1 to 5 weight percent silica.

4. The process of claim 1 in which the molybdena catalyst is prepared by admixing with the carrier.

5. In a process for the hydroforming of petroleum naphthas at elevated temperatures in the range of 750 to 1150° F. and pressures utilizing a molybdic oxide catalyst supported on an active alumina-containing base, the improvement which comprises heating the catalyst to a temperature of 1400–1500° F. for from 1 to 6 hours in a flowing stream of inert gas, cooling the heated catalyst to a temperature of above 750° F. and charging said hot catalyst to the hydroforming process immediately so that it does not cool down below a minimum temperature of 750° F.

6. The process according to claim 5 in which said hydroforming process takes place at a temperature of from 750 to 950° F., said catalyst contains from about 5–15% molybdic oxide, and said carrier contains from about 1–5 wt. percent silica.

References Cited in the file of this patent

UNITED STATES PATENTS

| | | |
|---|---|---|
| 2,426,118 | Parker et al | Aug. 19, 1947 |
| 2,432,822 | Secor | Dec. 16, 1947 |
| 2,437,531 | Huffman | Mar. 9, 1948 |
| 2,487,564 | Layng | Nov. 8, 1949 |
| 2,608,534 | Fleck | Aug. 26, 1952 |
| 2,676,907 | Oblad et al. | Apr. 27, 1954 |
| 2,768,933 | Burton et al. | Oct. 30, 1956 |